US012662095B2

(12) United States Patent
Hosamani et al.

(10) Patent No.: US 12,662,095 B2
(45) Date of Patent: Jun. 23, 2026

(54) AIRCRAFT, METHOD, AND COMPUTER READABLE MEDIUM FOR CONTROLLING BRAKE ACTION OF AN AIRCRAFT

(71) Applicant: The Boeing Company, Arlington, VA (US)

(72) Inventors: Umesh Hosamani, Bangalore (IN); Prasad Rao Piradi, Bengaluru (IN); Akshay Arun Sankeshwari, Bengaluru (IN)

(73) Assignee: The Boeing Company, Arlington, VA (US)

( * ) Notice: Subject to any disclaimer, the term of this patent is extended or adjusted under 35 U.S.C. 154(b) by 326 days.

(21) Appl. No.: 18/300,357

(22) Filed: Apr. 13, 2023

(65) Prior Publication Data

US 2024/0343234 A1     Oct. 17, 2024

(51) Int. Cl.
| | |
|---|---|
| *B60T 8/171* | (2006.01) |
| *B60T 8/17* | (2006.01) |
| *B60T 8/32* | (2006.01) |
| *B64C 25/42* | (2006.01) |

(52) U.S. Cl.
CPC ............ *B60T 8/171* (2013.01); *B60T 8/1703* (2013.01); *B60T 8/325* (2013.01); *B64C 25/42* (2013.01); *B60T 2210/10* (2013.01); *B60T 2210/32* (2013.01); *B60T 2250/00* (2013.01); *B60T 2250/02* (2013.01)

(58) Field of Classification Search
CPC ........ B60T 8/171; B60T 8/1703; B60T 8/325; B60T 2210/10; B60T 2210/32; B60T 2250/00; B60T 2250/02; B60T 8/172; B64C 25/42; B64C 25/426

See application file for complete search history.

(56) References Cited

U.S. PATENT DOCUMENTS

| | | | | |
|---|---|---|---|---|
| 2016/0140854 A1* | 5/2016 | Enns | .......................... | G08G 5/21 |
| | | | | 701/16 |
| 2017/0183086 A1* | 6/2017 | Le-Bouedec | ............ | G08G 5/54 |
| 2019/0147752 A1* | 5/2019 | Scarlatti | ............... | G06Q 10/047 |
| | | | | 701/120 |
| 2020/0013297 A1* | 1/2020 | Kanagarajan | ............ | G08G 5/25 |
| 2020/0168108 A1* | 5/2020 | Letsu-Dake | ............. | G08G 5/26 |
| 2020/0180781 A1* | 6/2020 | Mckeown | ................ | G08G 5/54 |
| 2021/0090444 A1* | 3/2021 | Bortolini | ................... | G08G 5/26 |

(Continued)

*Primary Examiner* — Christopher George Fees
(74) *Attorney, Agent, or Firm* — Harrity & Harrity, LLP

(57)     ABSTRACT

Disclosed is a controller for controlling brake action of an aircraft based on a current runway condition of the runway. The controller receives an expected condition of the runway and expected brake action for the aircraft from air traffic control, or other entity. The controller sends actual measured brake pressure applied by the aircraft while landing, along with sensor data from sensors on the aircraft configured to detect contaminants such as fluid or ice on the runway to a machine learning model. The machine learning model is configured to output a predicted brake action for the aircraft and predicted runway condition. The controller compares the expected brake action and expected runway condition to the predicted brake action and predicted runway condition. If there is any discrepancy, the controller sends the predicted brake action and runway condition to air traffic control to update the expected brake action and expected runway condition.

20 Claims, 6 Drawing Sheets

(56)                References Cited

U.S. PATENT DOCUMENTS

2022/0119128 A1* 4/2022 Raby ..................... B64C 25/426
2022/0332408 A1* 10/2022 Howell ................... B64C 25/42
2022/0348317 A1* 11/2022 Howell ................. B64D 45/08
2024/0062664 A1* 2/2024 He .......................... G08G 5/51
2024/0346212 A1* 10/2024 Miralles ................. B60T 8/325

* cited by examiner

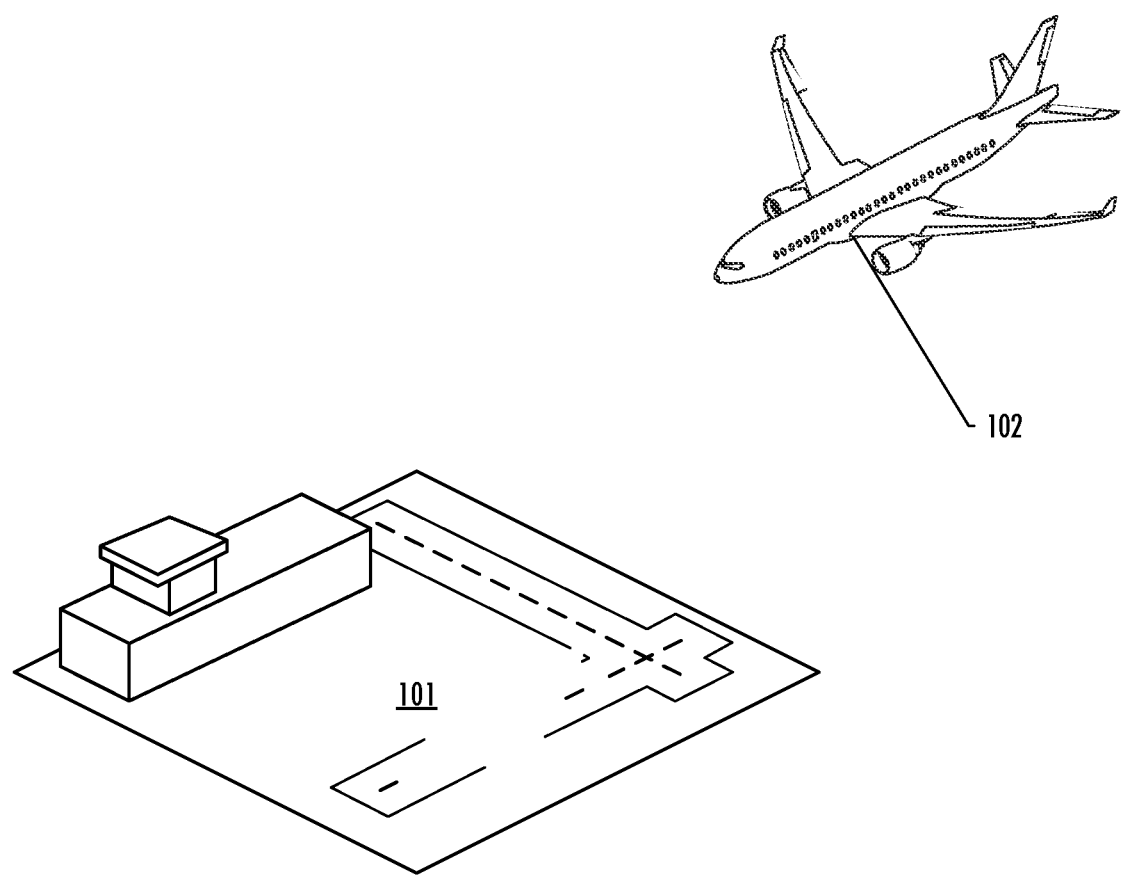
FIG. 1

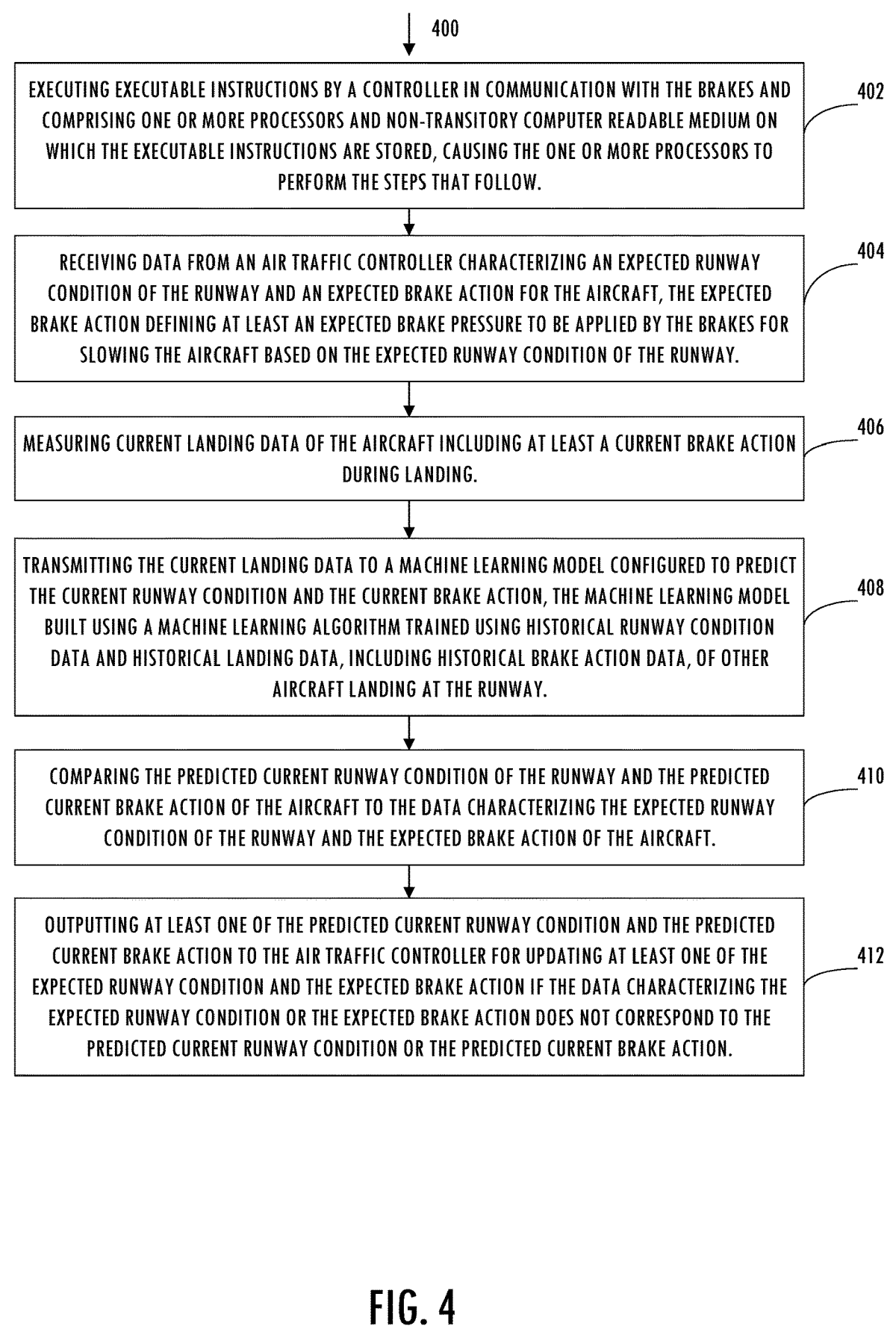

400

EXECUTING EXECUTABLE INSTRUCTIONS BY A CONTROLLER IN COMMUNICATION WITH THE BRAKES AND COMPRISING ONE OR MORE PROCESSORS AND NON-TRANSITORY COMPUTER READABLE MEDIUM ON WHICH THE EXECUTABLE INSTRUCTIONS ARE STORED, CAUSING THE ONE OR MORE PROCESSORS TO PERFORM THE STEPS THAT FOLLOW.  —402

RECEIVING DATA FROM AN AIR TRAFFIC CONTROLLER CHARACTERIZING AN EXPECTED RUNWAY CONDITION OF THE RUNWAY AND AN EXPECTED BRAKE ACTION FOR THE AIRCRAFT, THE EXPECTED BRAKE ACTION DEFINING AT LEAST AN EXPECTED BRAKE PRESSURE TO BE APPLIED BY THE BRAKES FOR SLOWING THE AIRCRAFT BASED ON THE EXPECTED RUNWAY CONDITION OF THE RUNWAY.  —404

MEASURING CURRENT LANDING DATA OF THE AIRCRAFT INCLUDING AT LEAST A CURRENT BRAKE ACTION DURING LANDING.  —406

TRANSMITTING THE CURRENT LANDING DATA TO A MACHINE LEARNING MODEL CONFIGURED TO PREDICT THE CURRENT RUNWAY CONDITION AND THE CURRENT BRAKE ACTION, THE MACHINE LEARNING MODEL BUILT USING A MACHINE LEARNING ALGORITHM TRAINED USING HISTORICAL RUNWAY CONDITION DATA AND HISTORICAL LANDING DATA, INCLUDING HISTORICAL BRAKE ACTION DATA, OF OTHER AIRCRAFT LANDING AT THE RUNWAY.  —408

COMPARING THE PREDICTED CURRENT RUNWAY CONDITION OF THE RUNWAY AND THE PREDICTED CURRENT BRAKE ACTION OF THE AIRCRAFT TO THE DATA CHARACTERIZING THE EXPECTED RUNWAY CONDITION OF THE RUNWAY AND THE EXPECTED BRAKE ACTION OF THE AIRCRAFT.  —410

OUTPUTTING AT LEAST ONE OF THE PREDICTED CURRENT RUNWAY CONDITION AND THE PREDICTED CURRENT BRAKE ACTION TO THE AIR TRAFFIC CONTROLLER FOR UPDATING AT LEAST ONE OF THE EXPECTED RUNWAY CONDITION AND THE EXPECTED BRAKE ACTION IF THE DATA CHARACTERIZING THE EXPECTED RUNWAY CONDITION OR THE EXPECTED BRAKE ACTION DOES NOT CORRESPOND TO THE PREDICTED CURRENT RUNWAY CONDITION OR THE PREDICTED CURRENT BRAKE ACTION.  —412

FIG. 4

AIRCRAFT, METHOD, AND COMPUTER READABLE MEDIUM FOR CONTROLLING BRAKE ACTION OF AN AIRCRAFT

BACKGROUND

Field of the Disclosure

The present disclosure is generally related to runway safety for a landing aircraft. More particularly, the present disclosure is related to controlling brake actions of an aircraft during landing.

Description of Related Art

Runway safety, particularly runway excursions, remain one of the top aviation safety concerns of the International Civil Aviation Organization (ICAO). The Flight Safety Foundation echoes these concerns, and indicates that the third most common landing excursion risk factor is ineffective brake action, due to runway contamination such as snow, ice, slush or water. This trend is also confirmed by the main aircraft manufacturers.

Runway excursions are the most frequent accident type in aviation, thus representing one of the most serious risks in aviation, and one of the most economically significant safety events. Runway excursions during landing continue to be the highest category of aircraft accidents and often exceed 25% of all annual commercial air transport accidents. Runway excursions often result in loss of life and/or injury to persons either onboard the aircraft or on the ground. Runway excursions sometimes result in damage to aircraft, the airfield, or both. Runway excursions are the first leading cause of aviation accidents and the third leading cause of transport airplane fatalities.

The Flight Safety Foundation echoes these concerns, and indicates that the third most common landing excursion risk factor is ineffective brake action due to runway contamination such as snow, ice, slush, or water. Investigations of reported runway safety events have identified shortfalls in the accuracy and timeliness of runway surface conditions reporting as contributing factors to many runway excursions. Currently, because of the existing method limitations in measuring the runway conditions and brake actions, accuracy and timeliness of reporting the runway conditions and brake actions is challenging.

There are two main reasons for runway excursions: 1) accuracy and timeliness of runway surface condition reporting and 2) inadequate brake action. With respect to the accuracy and timeliness of runway surface condition reporting, airdrome operators assess the runway surface conditions, including contaminants, for each third of the runway length, and report them by means of a uniform runway condition report (RCR). The air traffic services (ATS) convey this received RCR information to the end users (e.g., voice communications, ATIS, CPDLC) and aeronautical information services (AIS) provide the information received in the RCR to end users in the form of special series Notice to Air Missions (SNOWTAM) message. The aircraft operators utilize the information in conjunction with the performance data provided by the aircraft manufacturers to determine if landing or take-off operations are capable of being conducted safely and provide runway brake action special air-reports (AIREP).

Having reliable methods for identifying wet, slippery, or slushy runway conditions is very important. However, measuring the runway condition within a certain accuracy is very difficult because in order to measure runway conditions, the runway needs to be shut down. Thus, in order to avoid severe delays to air traffic, such measurements won't be able to be carried out very frequently. As a result, the reported runway conditions are often too old to be useful. This is especially true during heavy snowfalls where the conditions change very rapidly.

With respect to inadequate brake action, usually the pilot of landing aircraft reports the brake action experienced by them to the ATC and the ATC reports back the same to the next landing aircraft. However, because the pilot is basing a brake action assessment on the amount of deceleration that they perceive, it may be challenging to discern the true "brake action" because it may be masked by the use of reverse thrust and any displacement/impingement drag from loose surface contamination. Another challenge to reporting the brake action is that brake action varies along the runway. For example, some pilots may apply higher brake force at one end of the runway versus another. Due to the above limitations, reporting the runway condition and brake action is challenging and, therefore there is a need for an improved approach which helps in reporting runway conditions and brake action accurately in a timely manner.

It would therefore be desirable to have an aircraft system, method, and software that takes into account at least some of the issues discussed above, as well as other possible issues.

SUMMARY

Example implementations of the present disclosure are directed to an aircraft (including appropriate controller), method, and software for controlling brake action of the aircraft based on a current runway condition of the runway. The controller receives an expected condition of the runway and expected brake action for the aircraft from air traffic control, or some other entity. The controller sends actual measured brake pressure applied by the aircraft while landing along with sensor data from sensors on the aircraft configured to detect contaminants such as fluid or ice on the runway to a machine learning model. The machine learning model is configured to output a predicted brake action for the aircraft and a predicted runway condition. The controller compares the expected brake action and expected runway condition to the predicted brake action and predicted runway condition. If there is any discrepancy, the controller sends the predicted brake action and runway condition to air traffic control to update the expected brake action and expected runway condition.

The present disclosure thus includes, without limitation, the following example implementations.

Some example implementations provide a method for controlling brake action of an aircraft based on a current runway condition of a runway on which the aircraft is landing, the aircraft comprising a brake system including brakes configured to slow the aircraft during landing, the method comprising: executing executable instructions by a controller in communication with the brakes and comprising one or more processors and non-transitory computer readable medium on which the executable instructions are stored, causing the one or more processors to perform steps comprising: receiving data from an air traffic controller characterizing an expected runway condition of the runway and an expected brake action for the aircraft, the expected brake action defining at least an expected brake pressure to be applied by the brakes for slowing the aircraft based on the expected runway condition of the runway; measuring current landing data of the aircraft including at least a current brake action during landing; transmitting the current landing data to a machine learning model configured to predict the current runway condition and the current brake action, the machine learning model built using a machine learning algorithm trained using historical runway condition data and historical landing data, including historical brake action data, of other aircraft landing at the runway; comparing the predicted current runway condition of the runway and the predicted current brake action of the aircraft to the data characterizing the expected runway condition of the runway and the expected brake action of the aircraft; and outputting at least one of the predicted current runway condition and the predicted current brake action to the air traffic controller for updating at least one of the expected runway condition and the expected brake action if the data characterizing the expected runway condition or the expected brake action does not correspond to the predicted current runway condition or the predicted current brake action.

In some example implementations of the method of any preceding example implementation, or any combination thereof, the current brake action comprises at least a current brake pressure applied to the brakes, and wherein the current landing data further includes the deceleration rate of the aircraft, weather data, data indicating a runway used by the aircraft, and a location at which the aircraft exits the runway during landing.

In some example implementations of the method of any preceding example implementation, or any combination thereof, the method further comprises: receiving data indicating the deceleration rate of the aircraft during landing from a speedometer or accelerometer of the aircraft; receiving data indicating the location at which the aircraft exits the runway during landing from a navigation system of the aircraft; receiving data indicating the current brake pressure applied by the brakes during landing from a pressure sensor configured to measure the current brake pressure applied by the brakes during landing; receiving the weather data from a weather service provider, weather radar device, or from air traffic control; and receiving data indicating the runway used by the aircraft, including a length and width of the runway, from an on-board navigation database of the aircraft.

In some example implementations of the method of any preceding example implementation, or any combination thereof, the current landing data further includes aircraft configuration parameters selected from the group consisting of: aircraft model, weight, seat configuration, number of passengers onboard, and amount of fuel onboard the aircraft.

In some example implementations of the method of any preceding example implementation, or any combination thereof, further comprising measuring the current landing data using one or more sensors configured to detect fluids or ice on the runway or detect contaminants on the runway; and wherein the current landing data includes data characterizing a presence of fluids or ice on the runway or the contaminants on the runway.

In some example implementations of the method of any preceding example implementation, or any combination thereof, the expected brake action and the predicted current brake action further include data characterizing: a deceleration rate of the aircraft, reverse thrust applied on the aircraft, wind effects on the aircraft during landing, and a time it takes, from touchdown, for the aircraft to reach taxi speed or landing roll.

In some example implementations of the method of any preceding example implementation, or any combination thereof, the predicted current runway condition output to the air traffic controller and the expected runway condition received from the air traffic controller are characterized using a runway condition description selected from the group consisting of: "dry", "wet", "slippery wet", and "contaminated", and wherein the method further comprises storing the predicted current runway condition and the predicted current brake action in a cloud storage device, using Internet of Things (IoT) protocols, for further analysis and made available to a next landing aircraft at the runway, flight dispatchers, or air traffic controller.

Some other example implementations provide an aircraft comprising: a brake system for controlling brake action of the aircraft based on a current runway condition of a runway, the brake system comprising brakes configured to slow the aircraft during landing; a controller in communication with the brakes and comprising one or more processors and non-transitory computer readable medium on which executable instructions are stored, the controller being configured to execute the executable instructions, which causes the one or more processors to be configured to: receive data from an air traffic controller characterizing an expected runway condition of the runway and an expected brake action for the aircraft, the expected brake action defining at least an expected brake pressure to be applied by the brakes for slowing the aircraft based on the expected runway condition of the runway; measure current landing data of the aircraft including at least a current brake action during landing; transmit the current landing data to a machine learning model configured to predict the current runway condition and the current brake action, the machine learning model built using a machine learning algorithm trained using historical runway condition data and historical landing data, including historical brake action data, of other aircraft landing at the runway; compare the predicted current runway condition of the runway and the predicted current brake action of the aircraft to the data characterizing the expected runway condition of the runway and the expected brake action of the aircraft; and output at least one of the predicted current runway condition and the predicted current brake action to the air traffic controller for updating at least one of the expected runway condition and the expected brake action if the data characterizing the expected runway condition or the expected brake action does not correspond to the predicted current runway condition or the predicted current brake action.

In some example implementations of the aircraft of any preceding example implementation, or any combination thereof, the current brake action comprises at least a current brake pressure applied to the brakes, and wherein the current landing data further includes the deceleration rate of the aircraft, weather data, data indicating a runway used by the aircraft, and a location at which the aircraft exits the runway during landing.

In some example implementations of the aircraft of any preceding example implementation, or any combination thereof, the aircraft further comprises a speedometer or accelerometer configured to measure or determine the deceleration rate of the aircraft during landing; and a navigation system configured to determine the location at which the aircraft exits the runway during landing; wherein the controller is in communication with a pressure sensor configured to measure the current brake pressure applied by the brakes during landing; wherein the weather data is received from a weather service provider, weather radar device, or from air traffic control; and wherein data indicating the runway used by the aircraft, including a length and width of the runway, is retrieved from an on-board navigation database of the aircraft.

In some example implementations of the aircraft of any preceding example implementation, or any combination thereof, the current landing data further includes aircraft configuration parameters selected from the group consisting of: aircraft model, weight, seat configuration, number of passengers onboard, and amount of fuel onboard the aircraft.

In some example implementations of the aircraft of any preceding example implementation, or any combination thereof, the controller is further configured to measure the current landing data using one or more sensors configured to detect fluids or ice on the runway or detect contaminants on the runway; and wherein the current landing data includes data characterizing a presence of fluids or ice on the runway or the contaminants on the runway.

In some example implementations of the aircraft of any preceding example implementation, or any combination thereof, the expected brake action and the predicted current brake action further include data characterizing: a deceleration rate of the aircraft, reverse thrust applied on the aircraft, wind effects on the aircraft during landing, and a time it takes, from touchdown, for the aircraft to reach taxi speed or landing roll.

In some example implementations of the aircraft of any preceding example implementation, or any combination thereof, wherein the predicted current runway condition output to the air traffic controller and the expected runway condition received from the air traffic controller are characterized using a runway condition description selected from the group consisting of: "dry", "wet", "slippery wet", and "contaminated", and wherein the one or more processors are further configured to store the predicted current runway condition and the predicted current brake action in a cloud storage device, using Internet of Things (IoT) protocols, for further analysis and made available to a next landing aircraft at the runway, flight dispatchers, or air traffic controller Some other example implementations provide a non-transitory computer readable storage medium having executable instructions stored thereon for controlling brake action of an aircraft based on a current runway condition of a runway on which the aircraft is landing, the aircraft comprising a brake system including brakes configured to slow the aircraft during landing, the executable instructions being executable by one or more processors of a controller in communication with the brakes, wherein upon execution of the executable instructions the one or more processors are configured to: receive data from an air traffic controller characterizing an expected runway condition of the runway and an expected brake action for the aircraft, the expected brake action defining at least an expected brake pressure to be applied by the brakes for slowing the aircraft based on the expected runway condition of the runway; measure current landing data of the aircraft including at least a current brake action during landing; transmit the current landing data to a machine learning model configured to predict the current runway condition and the current brake action, the machine learning model built using a machine learning algorithm trained using historical runway condition data and historical landing data, including historical brake action data, of other aircraft landing at the runway; compare the predicted current runway condition of the runway and the predicted current brake action of the aircraft to the data characterizing the expected runway condition of the runway and the expected brake action of the aircraft; and output at least one of the predicted current runway condition and the predicted current brake action to the air traffic controller for updating at least one of the expected runway condition and the expected brake action if the data characterizing the expected runway condition or the expected brake action does not correspond to the predicted current runway condition or the predicted current brake action.

In some example implementations of the computer readable storage medium of any preceding example implementation, or any combination thereof, the current brake action comprises at least a current brake pressure applied to the brakes, and wherein the current landing data further includes the deceleration rate of the aircraft, weather data, data indicating a runway used by the aircraft, and a location at which the aircraft exits the runway during landing; wherein the one or more processors are further configured to: receive data indicating the deceleration rate of the aircraft during landing from a speedometer or accelerometer of the aircraft; receive data indicating the location at which the aircraft exits the runway during landing from a navigation system of the aircraft; receive data indicating the current brake pressure applied by the brakes during landing from a pressure sensor configured to measure the current brake pressure applied by the brakes during landing; receive the weather data from a weather service provider, weather radar device, or from air traffic control; and receive data indicating the runway used by the aircraft, including a length and width of the runway, from an on-board navigation database of the aircraft.

In some example implementations of the computer readable storage medium of any preceding example implementation, or any combination thereof, the current landing data further includes aircraft configuration parameters selected from the group consisting of: aircraft model, weight, seat configuration, number of passengers onboard, and amount of fuel onboard the aircraft.

In some example implementations of the computer readable storage medium of any preceding example implementation, or any combination thereof, the one or more processors are further configured to measure the current landing data using one or more sensors configured to detect fluids or ice on the runway or detect contaminants on the runway; and wherein the current landing data includes data characterizing a presence of fluids or ice on the runway or the contaminants on the runway.

In some example implementations of the computer readable storage medium of any preceding example implementation, or any combination thereof, the expected brake action and the predicted current brake action further include data characterizing: a deceleration rate of the aircraft, reverse thrust applied on the aircraft, wind effects on the aircraft during landing, and a time it takes, from touchdown, for the aircraft to reach taxi speed or landing roll.

In some example implementations of the computer readable storage medium of any preceding example implementation, or any combination thereof, the predicted current runway condition output to the air traffic controller and the expected runway condition received from the air traffic controller are characterized using a runway condition description selected from the group consisting of: "dry", "wet", "slippery wet", and "contaminated", and wherein the one or more processors are further configured to store the predicted current runway condition and the predicted current brake action in a cloud storage device, using Internet of Things (IoT) protocols, for further analysis and made available to a next landing aircraft at the runway, flight dispatchers, or air traffic controller.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 illustrates an aircraft landing environment, according to some embodiments of the present disclosure;

FIG. 4 illustrates a flow chart detailing steps of an example method, according to some embodiments of the present disclosure.

DETAILED DESCRIPTION OF THE DISCLOSURE

Figure 2A:
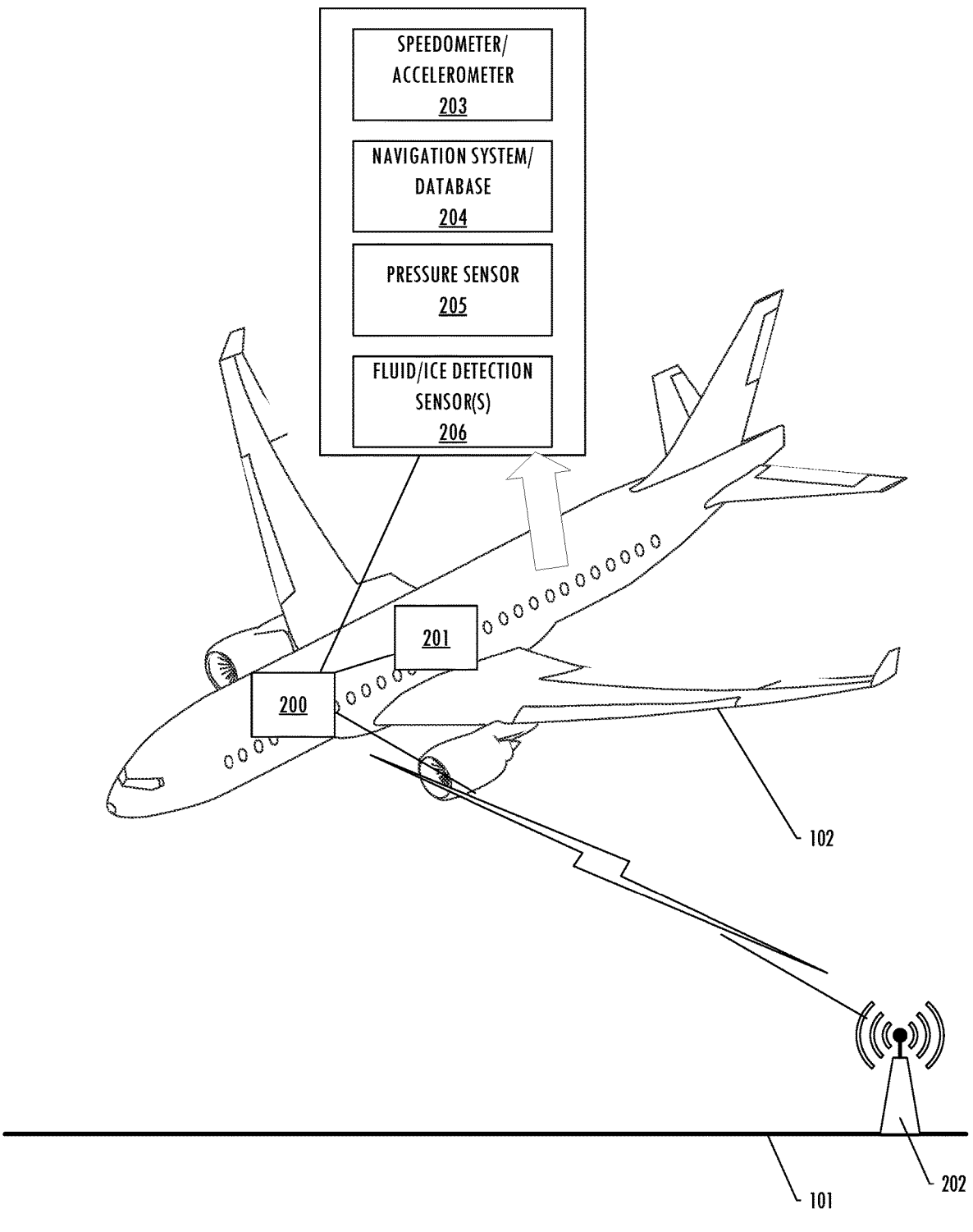
FIG. 2A illustrates an aircraft with various system components onboard, according to some embodiments of the present disclosure.

Some examples of the present disclosure will now be described more fully hereinafter with reference to the accompanying drawings, in which some, but not all aspects of the disclosure are shown. Indeed, various examples of the disclosure are embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) is instead below, and vice versa; and similarly, something described as being to the left of something else is instead to the right, and vice versa. Like reference numerals refer to like elements throughout.

FIG. 1 illustrates an aircraft landing environment 100 according to some implementations of the present disclosure. In some implementations, the aircraft, method, and computer readable medium of the present disclosure are used by aircraft, pilots, and other users in the times before, during, and after an aircraft 102 landing on a runway 101. As described above, the subject matter of the present disclosure is configured to help minimize runway excursions wherein ice, water, or other debris on the runway causes an aircraft to skid, slide, or otherwise detour outside its expected path on the runway (e.g., sliding off the runway, hydroplaning, sliding on slush, etc.).

FIG. 2A illustrates an aircraft 102 on approach for landing on the runway 101. The angle of attack of the aircraft, relative size of the runway, and the location of various components are not drawn to scale or are not necessarily located in real-world locations. The drawing is meant for illustrative purposes only and should not be construed as limiting the aircraft, its systems, or the runway in any way. In some implementations, the aircraft comprises a brake system 201 for controlling brake action of the aircraft based on a current runway condition of a runway (e.g., runway 101), and the brake system comprises brakes configured to slow the aircraft during landing. Additionally, the aircraft comprises a controller 200 in communication with the brakes. The controller is further in communication with a ground station 202 which houses various systems and computing devices. In some implementations, the ground station includes one or more ground stations, such as multiple computers stored individually in different locations, or multiple air traffic controllers (interchangeably referred to herein as "air traffic controller(s)" or "ATC"). When referring to the ground station herein, the present disclosure is intended to encompass devices stored in one or more locations or one or more ATCs.

In some implementations, the controller 200 is further in communication with a speedometer or accelerometer 203 of the aircraft to determine a speed or acceleration/deceleration of the aircraft. In some implementations, the controller is further in communication with a navigation system and/or navigation database 204 of the aircraft and the controller is configured to receive historical and current position and location data from the navigation system and/or navigation database. In some implementations, the controller is further in communication with a pressure sensor 205 of the braking system 201 of the aircraft, and the controller is configured to determine a brake pressure applied by the braking system. In some other implementations, the controller is in communication with fluid/ice detection sensor(s) 206 on the aircraft, and the controller is configured to receive data from the fluid/ice detection sensors characterizing presence of ice or fluid on the runway.

Figure 2B:
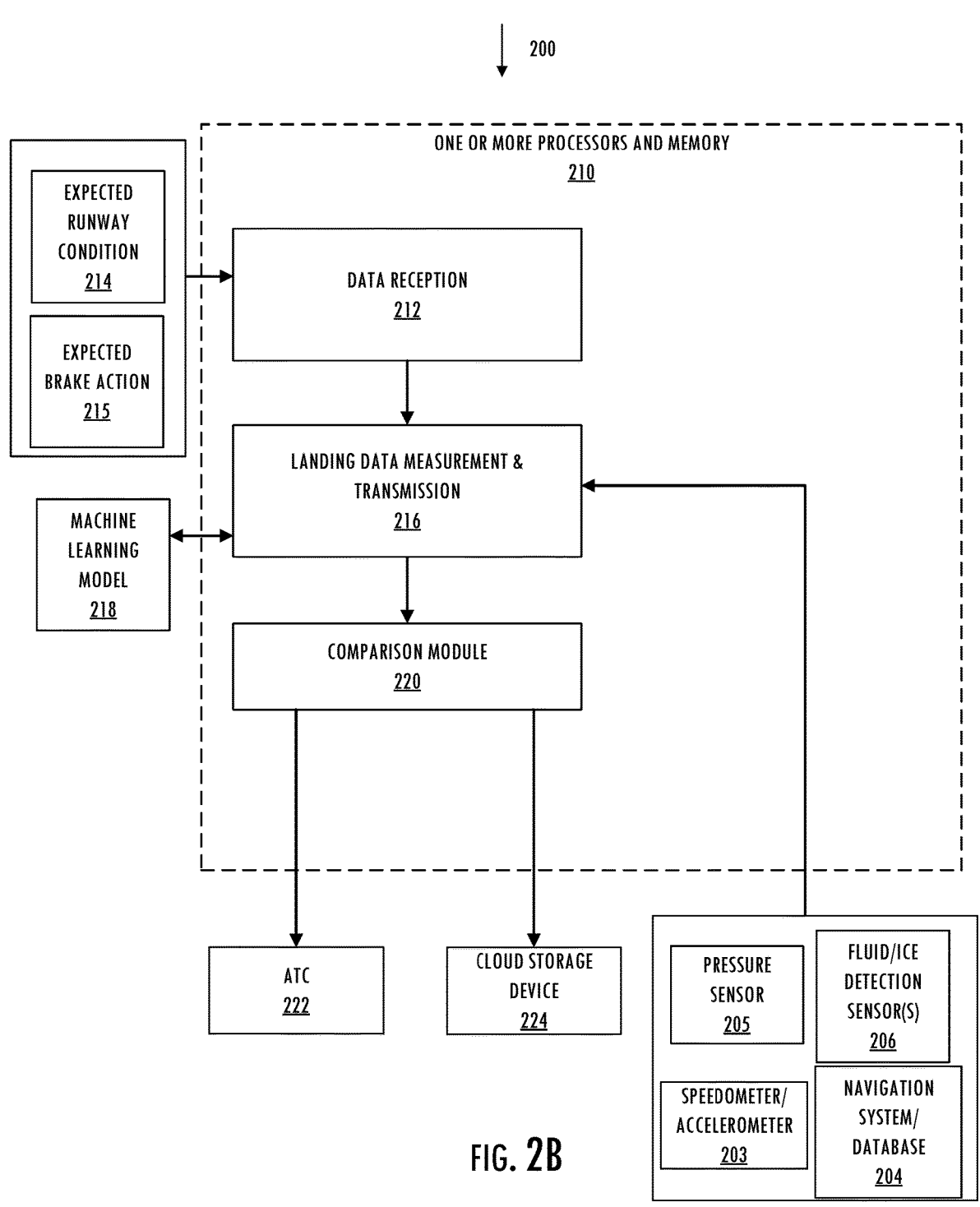
FIG. 2B illustrates a block diagram of a controller, according to some embodiments of the present disclosure.

FIG. 2B illustrates a block diagram of an example controller 200 operating onboard the aircraft 102 from FIG. 2A for controlling brake action of the aircraft based on a current runway condition of the runway 101. In some implementations, the controller comprises one or more processors and non-transitory computer readable medium 210 on which executable instructions are stored, the controller being configured to execute the executable instructions. Upon execution of the executable instructions, the one or more processors are configured to perform various functions as described hereinbelow. In some implementations, the controller includes a data reception block 212 configured to receive data from an air traffic controller (e.g., ATC 222 discussed hereinbelow) characterizing an expected runway condition 214 of the runway and an expected brake action 215 for the aircraft, the expected brake action defining at least an expected brake pressure to be applied by the brakes for slowing the aircraft based on the expected runway condition of the runway.

In some implementations, the expected runway condition 214 of the runway received from the air traffic controller is characterized using a runway condition description selected from the group consisting of: "dry", "wet", "slippery wet", and "contaminated". In some implementations, the expected brake pressure is dependent on many factors such as, type of aircraft, weight, configuration of the aircraft, initiation touchdown location, and the like. Therefore, expected brake pressure received by the aircraft will be dependent on at least some of these factors. In some implementations, the expected brake action further includes data characterizing: a deceleration rate of the aircraft, reverse thrust applied on the aircraft, wind effects on the aircraft during landing, and a time it takes, from touchdown, for the aircraft to reach taxi speed or landing roll. These data are also aircraft dependent.

In some implementations, the controller 200 further includes a landing data measurement and transmission block 216 configured to measure current landing data of the aircraft 102 including at least a current brake action during landing. As described above, in some implementations, the aircraft comprises various sensors, including pressure sensor(s) 205 for measuring the brake pressure applied by the brakes of the aircraft, fluid/ice detection sensor(s) 206 for detecting ice, fluid, or other contaminant on the runway, and a speedometer or accelerometer 203 to determine the speed, acceleration, or deceleration of the aircraft (e.g., during landing). The controller is in communication with these sensors and the landing data measurement and transmission block receives data readings from these sensors.

In some implementations, the current brake action comprises at least a current brake pressure applied to the brakes, and the current landing data further includes the deceleration rate of the aircraft, weather data, data indicating a runway used by the aircraft, and a location at which the aircraft exits the runway during landing. In some implementations, weather data is received from a weather service provider, weather radar device, or from air traffic control. In some implementations, data indicating the runway used by the aircraft, including a length and width of the runway, is retrieved from the on-board navigation database 204 of the aircraft. In some implementations, the current landing data further includes aircraft configuration parameters selected from the group consisting of: aircraft model, weight, seat configuration, number of passengers onboard, and amount of fuel onboard the aircraft. In some implementations, the controller is further configured to measure the current landing data using the fluid/ice detection sensor(s) 206 configured to detect fluids or ice on the runway or detect contaminants on the runway. Additionally, in some implementations, the current landing data includes data characterizing a presence of fluids or ice on the runway or the contaminants on the runway.

Once the current landing data is measured, the landing data measurement and transmission block 216 is configured to transmit the current landing data to a machine learning model 218 configured to predict the current runway condition and the current brake action. In some implementations, the machine learning model is built using a machine learning algorithm trained using historical runway condition data and historical landing data, including historical brake action data, of other aircraft landing at the runway. The machine learning model transmits the predicted current runway condition and the predicted current brake action of the aircraft back to the controller 200. In some implementations, the predicted current brake action includes data characterizing: a deceleration rate of the aircraft, reverse thrust applied on the aircraft, wind effects on the aircraft during landing, and a time it takes, from touchdown, for the aircraft to reach taxi speed or landing roll. In some other implementations, the controller 200 further includes a comparison module 220 configured to compare the predicted current runway condition of the runway and the predicted current brake action of the aircraft to the data characterizing the expected runway condition of the runway and the expected brake action of the aircraft.

In some implementations, based on the comparison made by the comparison module 220, the controller 200 is further configured to output at least one of the predicted current runway condition and the predicted current brake action to the ATC 222 for updating at least one of the expected runway condition and the expected brake action if the data characterizing the expected runway condition or the expected brake action does not correspond to the predicted current runway condition or the predicted current brake action. In some implementations, the predicted current runway condition output to the ATC is characterized using a runway condition description selected from the group consisting of: "dry", "wet", "slippery wet", and "contaminated". For example, if the expected runway condition from ATC is "dry", but the predicted current runway condition is "wet", the controller will output the predicted current runway condition (i.e., "wet") to ATC to allow ATC to review and update the expected runway condition. For example, the controller is configured to send the predicted current runway condition of "wet" to an ATC controlled database storing the expected runway condition is updated to "wet".

Furthermore, in some implementations, the controller 200 is configured to send and store the predicted current runway condition and the predicted current brake action in a cloud storage device 224, using Internet of Things (IoT) protocols, for further analysis. In some implementations, the predicted current brake action is made available (e.g., stored in a publicly accessible database) to a next landing aircraft at the runway, flight dispatchers, or air traffic controller. The next aircraft to land (which should also be sent the expected runway conditions and expected brake action) and the currently landing aircraft are then able to adjust their brake pressure and other functions of the aircraft to accommodate the actual runway conditions.

Figure 3:
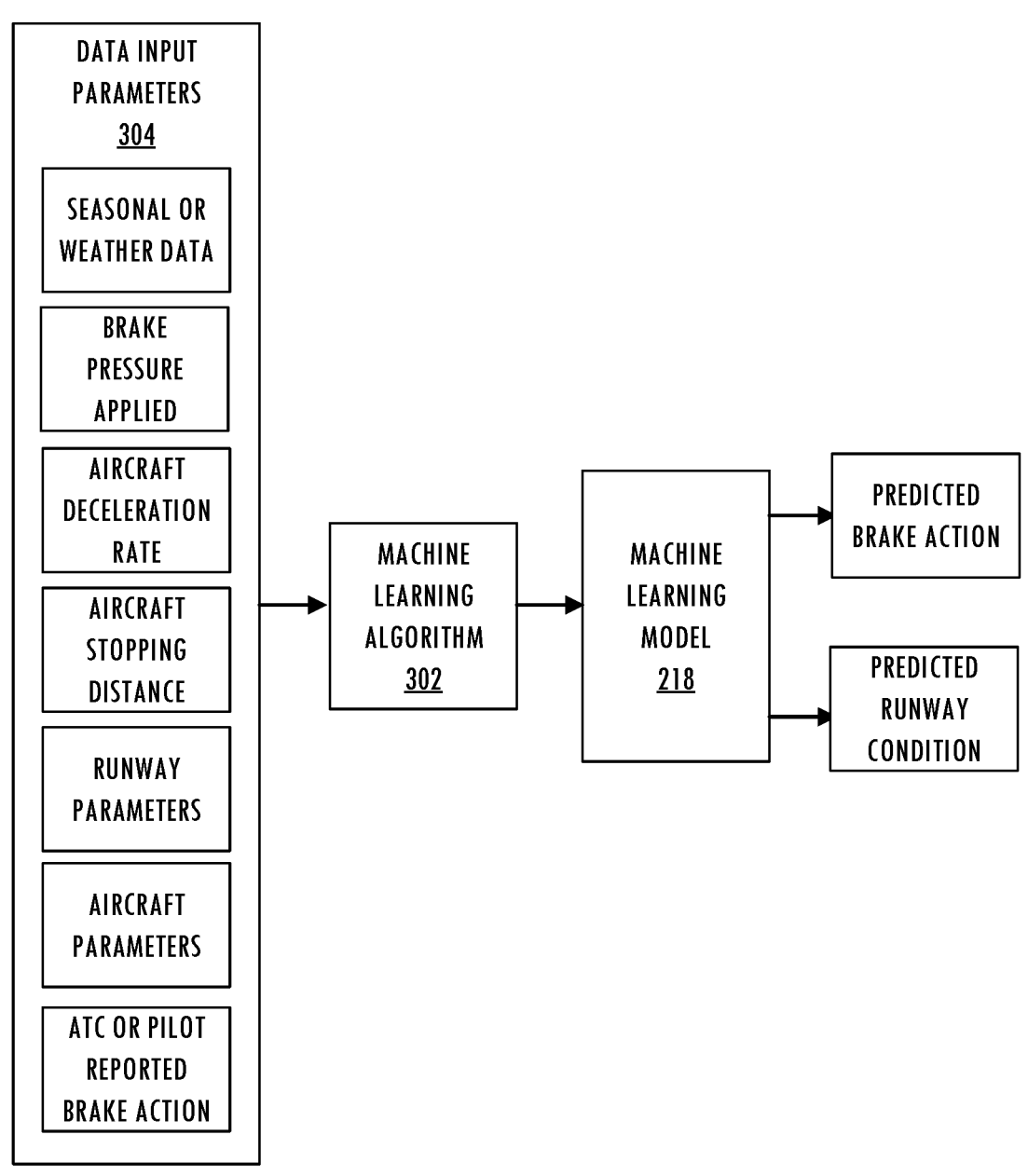
FIG. 3 illustrates a block diagram of an example machine learning environment, according to some embodiments of the present disclosure.

FIG. 3 illustrates a block diagram of an example machine learning environment 300 according to some implementations of the present disclosure. As described above, the machine learning model 218 is built by a machine learning algorithm 302 trained using data input parameters 304, including historical runway condition data and historical landing data, including historical brake action data, of other aircraft landing at the runway. The data input parameters further include, but are not limited to, seasonal or weather data, historical brake pressure applied, historical aircraft deceleration rates, historical aircraft stopping distance, runway parameters, aircraft parameters, historical ATC or pilot reported brake action, and the like. These data inputs are used to build and train the machine learning model, which is routinely updated with new data to provide ever more accurate predicted current runway conditions and predicted brake action.

FIG. 4 illustrates a flow chart of an example method 400 for controlling brake action of an aircraft based on a current runway condition of a runway on which the aircraft is landing. In some implementations of the method, the aircraft comprises a brake system including brakes configured to slow the aircraft during landing. As shown at block 402, the method includes executing executable instructions by a controller in communication with the brakes and comprising one or more processors and non-transitory computer readable medium on which the executable instructions are stored, causing the one or more processors to perform the steps that follow. As shown at block 404, the method includes receiving data from an air traffic controller characterizing an expected runway condition of the runway and an expected brake action for the aircraft, the expected brake action defining at least an expected brake pressure to be applied by the brakes for slowing the aircraft based on the expected runway condition of the runway.

As shown at block 406, the method 400 includes measuring current landing data of the aircraft including at least a current brake action during landing. At block 408, the method includes transmitting the current landing data to a machine learning model configured to predict the current runway condition and the current brake action, the machine learning model built using a machine learning algorithm trained using historical runway condition data and historical landing data, including historical brake action data, of other aircraft landing at the runway. At block 410, the method includes comparing the predicted current runway condition of the runway and the predicted current brake action of the aircraft to the data characterizing the expected runway condition of the runway and the expected brake action of the aircraft. At block 412, the method includes outputting at least one of the predicted current runway condition and the predicted current brake action to the air traffic controller for updating at least one of the expected runway condition and the expected brake action if the data characterizing the expected runway condition or the expected brake action does not correspond to the predicted current runway condition or the predicted current brake action.

According to example implementations of the present disclosure, the controller 200 for controlling brake action of an aircraft based on a current runway condition of a runway on which the aircraft is landing is implemented by various means. Means for implementing the system includes hardware, alone or under direction of one or more computer programs from a computer readable storage medium. In some examples, one or more apparatuses are configured to function as or otherwise implement the system shown and described herein. In examples involving more than one apparatus, the respective apparatuses are connected to or otherwise in communication with one another in a number of different manners, such as directly or indirectly via a wired or wireless network or the like.

Figure 5:
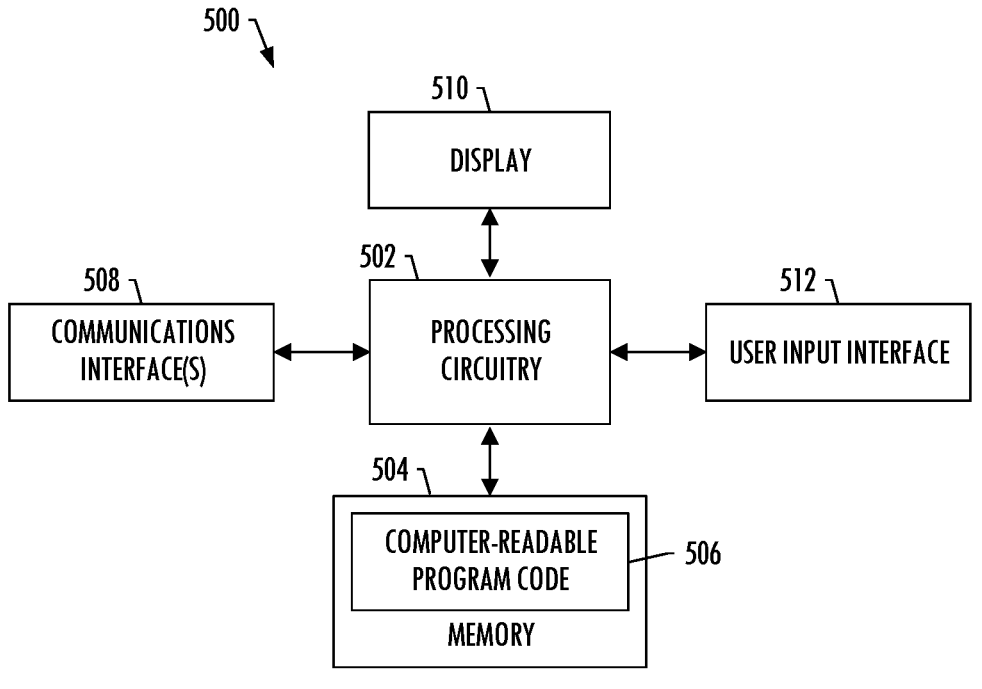
FIG. 5 illustrates an example apparatus for performing the method and other functions described herein, according to some embodiments of the present disclosure.

FIG. 5 illustrates an apparatus 500 capable of implementing the controller 200 of FIG. 2B for controlling brake action of an aircraft. The apparatus 500 is an example device that is used to implement the methods and functions described above with respect to the controller for controlling brake action of an aircraft. Generally, an apparatus of exemplary implementations of the present disclosure comprises, includes, or is embodied in one or more fixed or portable electronic devices. Examples of suitable electronic devices include a microcontroller, controller, smartphone, tablet computer, laptop computer, desktop computer, workstation computer, server computer or the like. The apparatus includes one or more of each of a number of components such as, for example, processing circuitry 502 (e.g., processor unit or computer processor) connected to a memory 504 (e.g., storage device).

The processing circuitry 502 is composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which is packaged as an integrated circuit or multiple interconnected integrated circuits (an integrated circuit at times more commonly referred to as a "chip"). The processing circuitry is configured to execute computer programs, which are stored onboard the processing circuitry or otherwise stored in the memory 504 (of the same or another apparatus).

The processing circuitry 502 includes a number of processors, a multi-core processor or some other type of processor, depending on the particular implementation. Further, the processing circuitry is implemented using a number of heterogeneous processor systems in which a main processor is present with one or more secondary processors on a single chip. As another illustrative example, the processing circuitry is a symmetric multi-processor system containing multiple processors of the same type. In yet another example, the processing circuitry is embodied as or otherwise include one or more ASICs, FPGAs or the like. Thus, although the processing circuitry is capable of executing a computer program to perform one or more functions, the processing circuitry of various examples is capable of performing one or more functions without the aid of a computer program. In either instance, the processing circuitry is appropriately programmed to perform functions or operations according to example implementations of the present disclosure.

The memory 504 is generally any piece of computer hardware that is capable of storing information such as, for example, data, computer programs (e.g., computer readable program code 506) and/or other suitable information either on a temporary basis and/or a permanent basis. The memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks include compact disk-read only memory (CD-ROM), compact disk-read/write (CD-R/W), DVD or the like. In various instances, the memory is referred to as a computer readable storage medium. The computer readable storage medium is a non-transitory device capable of storing information, and is distinguishable from computer readable transmission media such as electronic transitory signals capable of carrying information from one location to another. Computer readable medium as described herein generally refer to a computer readable storage medium or computer readable transmission medium.

In addition to the memory 504, the processing circuitry 502 is also connected to one or more interfaces for displaying, transmitting and/or receiving information. The interfaces include a communications interface 508 (e.g., communications unit) and/or one or more user interfaces. The communications interface is configured to transmit and/or receive information, such as to and/or from other apparatus(es), network(s) or the like. The communications interface is configured to transmit and/or receive information by physical (wired) and/or wireless communications links. Examples of suitable communication interfaces include a network interface controller (NIC), wireless NIC (WNIC) or the like.

The user interfaces include a display 510 and/or one or more user input interfaces 512 (e.g., input/output unit). The display is configured to present or otherwise display information to a user, suitable examples of which include a liquid crystal display (LCD), light-emitting diode display (LED), plasma display panel (PDP) or the like. The user input interfaces are wired or wireless, and are configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces further include one or more interfaces for communicating with peripherals such as printers, scanners or the like.

As indicated above, program code instructions are stored in memory, and executed by processing circuitry that is thereby programmed, to implement functions of the systems, subsystems, tools and their respective elements described herein. As will be appreciated, any suitable program code instructions are loaded onto a computer or other programmable apparatus from a computer readable storage medium to produce a particular machine, such that the particular machine becomes a means for implementing the functions specified herein. These program code instructions are also stored in a computer readable storage medium that direct a computer, a processing circuitry or other programmable apparatus to function in a particular manner to thereby generate a particular machine or particular article of manufacture. The instructions stored in the computer readable storage medium produce an article of manufacture, where the article of manufacture becomes a means for implementing functions described herein. The program code instructions are retrieved from a computer readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions are performed sequentially such that one instruction is retrieved, loaded and executed at a time. In some example implementations, retrieval, loading and/or execution are performed in parallel such that multiple instructions are retrieved, loaded, and/or executed together. Execution of the program code instructions produce a computer-implemented process such that the instructions executed by the computer, processing circuitry or other programmable apparatus provide operations for implementing functions described herein.

Execution of instructions by a processing circuitry, or storage of instructions in a computer readable storage medium, supports combinations of operations for performing the specified functions. In this manner, the apparatus 500 includes the processing circuitry 502 and the computer readable storage medium or memory 504 coupled to the processing circuitry, where the processing circuitry is configured to execute computer readable program code 506 stored in the memory. It will also be understood that one or more functions, and combinations of functions, are implemented by special purpose hardware-based computer systems and/or processing circuitry which perform the specified functions, or combinations of special purpose hardware and program code instructions.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions are be provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. are used herein to describe various steps or calculations, these steps or calculations should not be limited by these terms. These terms are only used to distinguish one operation or calculation from another. For example, a first calculation is termed a second calculation, and, similarly, a second step is termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular implementations only and is not intended to be limiting.

That which is claimed:

1. An aircraft comprising:

a brake system for controlling brake action of the aircraft based on a current runway condition of a runway, the brake system comprising brakes configured to slow the aircraft during landing;

a controller device in communication with the brakes and comprising one or more processors and non-transitory computer readable medium on which executable instructions are stored, the controller device being configured to execute the executable instructions, which causes the one or more processors to be configured to:

receive data from an air traffic controller characterizing an expected runway condition of the runway and an expected brake action for the aircraft, the expected brake action defining at least an expected brake pressure to be applied by the brakes for slowing the aircraft based on the expected runway condition of the runway;

measure, via a landing data measurement and transmission component of the controller device, current landing data of the aircraft including at least a current brake action during landing and data indicating a location at which the aircraft exits the runway during landing, wherein the data indicating the location at which the aircraft exits the runway during landing is determined via a navigation system, wherein the current brake action includes information associated with pressure applied to the brakes measured by a pressure sensor, and wherein the controller device is in communication with a plurality of sensors of the aircraft, including at least the pressure sensor;

transmit, by the landing data measurement and transmission component, the current landing data to a machine learning model configured to predict the current runway condition and the current brake action, the machine learning model built using a machine learning algorithm trained using historical runway condition data and historical landing data, including historical brake action data, of other aircraft landing at the runway;

compare the predicted current runway condition of the runway and the predicted current brake action of the aircraft to the data characterizing the expected runway condition of the runway and the expected brake action of the aircraft;

output at least one of the predicted current runway condition and the predicted current brake action to the air traffic controller for updating at least one of the expected runway condition and the expected brake action if the data characterizing the expected runway condition or the expected brake action does not correspond to the predicted current runway condition or the predicted current brake action; and cause, based on the output, at least one of the aircraft or another aircraft to adjust its brake pressure to accommodate for runway conditions.

2. The aircraft of claim 1, wherein the current brake action comprises at least a current brake pressure applied to the brakes, and wherein the current landing data further includes a deceleration rate of the aircraft, weather data, data indicating a runway used by the aircraft, and a location at which the aircraft exits the runway during landing, wherein the weather data is received from a weather service provider, weather radar device, or from air traffic control, wherein data indicating the runway used by the aircraft, including a length and width of the runway, is retrieved from an on-board navigation database of the aircraft, and wherein the aircraft further comprises:

a speedometer or accelerometer configured to measure or determine the deceleration rate of the aircraft during landing.

3. The aircraft of claim 1, wherein the current landing data further includes aircraft configuration parameters selected from the group consisting of: aircraft model, weight, seat configuration, number of passengers onboard, and amount of fuel onboard the aircraft.

4. The aircraft of claim 1, wherein the controller device is further configured to measure the current landing data using one or more sensors, of the plurality of sensors, configured to detect fluids or ice on the runway or detect contaminants on the runway; and wherein the current landing data includes data characterizing a presence of fluids or ice on the runway or the contaminants on the runway.

5. The aircraft of claim 1, wherein the expected brake action and the predicted current brake action further include data characterizing: a deceleration rate of the aircraft, reverse thrust applied on the aircraft, wind effects on the aircraft during landing, and a time it takes, from touchdown, for the aircraft to reach taxi speed or landing roll.

6. The aircraft of claim 1, wherein the predicted current runway condition output to the air traffic controller and the expected runway condition received from the air traffic controller are characterized using a runway condition description selected from the group consisting of: "dry", "wet", "slippery wet", and "contaminated", and wherein the one or more processors are further configured to:

store the predicted current runway condition and the predicted current brake action in a cloud storage device, using Internet of Things (IoT) protocols, for analysis and made available to a next landing aircraft at the runway, flight dispatchers, or air traffic controller.

7. The aircraft of claim 1, wherein data indicating the runway used for data indicating the location at which the aircraft exits the runway during landing, includes at least one of a length or width of the runway.

8. A method for controlling brake action of an aircraft based on a current runway condition of a runway on which the aircraft is landing, the aircraft comprising a brake system including brakes configured to slow the aircraft during landing, the method comprising:

executing executable instructions by a controller device in communication with the brakes and comprising one or more processors and non-transitory computer readable medium on which the executable instructions are stored, causing the one or more processors to perform steps comprising:

receiving data from an air traffic controller characterizing an expected runway condition of the runway and an expected brake action for the aircraft, the expected brake action defining at least an expected brake pressure to be applied by the brakes for slowing the aircraft based on the expected runway condition of the runway;

measuring, via a landing data measurement and transmission component of the controller device, current landing data of the aircraft including at least a current brake action during landing and data indicating a location at which the aircraft exits the runway during landing, wherein the data indicating the location at which the aircraft exits the runway during landing is determined via a navigation system, wherein the current brake action includes information associated with pressure applied to the brakes measured by a pressure sensor, and wherein the controller device is in communication with a plurality of sensors of the aircraft, including at least the pressure sensor;

transmitting, by the landing data measurement and transmission component, the current landing data to a machine learning model configured to predict the current runway condition and the current brake action, the machine learning model built using a machine learning algorithm trained using historical runway condition data and historical landing data, including historical brake action data, of other aircraft landing at the runway;

comparing the predicted current runway condition of the runway and the predicted current brake action of the aircraft to the data characterizing the expected runway condition of the runway and the expected brake action of the aircraft;

outputting at least one of the predicted current runway condition and the predicted current brake action to the air traffic controller for updating at least one of the expected runway condition and the expected brake action if the data characterizing the expected runway condition or the expected brake action does not correspond to the predicted current runway condition or the predicted current brake action; and causing, based on the output, at least one of the aircraft or another aircraft to adjust its brake pressure to accommodate for runway conditions.

9. The method of claim 8, wherein the current brake action comprises at least a current brake pressure applied to the brakes, and wherein the current landing data further includes a deceleration rate of the aircraft, weather data, data indicating a runway used by the aircraft, and a location at which the aircraft exits the runway during landing; and the method further comprising:

receiving data indicating the deceleration rate of the aircraft during landing from a speedometer or accelerometer of the aircraft;

receiving the data indicating the location at which the aircraft exits the runway during landing from the navigation system;

receiving data indicating the current brake pressure applied by the brakes during landing from a pressure sensor configured to measure the current brake pressure applied by the brakes during landing;

receiving the weather data from a weather service provider, weather radar device, or from air traffic control; and receiving data indicating the runway used by the aircraft, including a length and width of the runway, from an on-board navigation database of the aircraft.

10. The method of claim 8, wherein the current landing data further includes aircraft configuration parameters selected from the group consisting of: aircraft model, weight, seat configuration, number of passengers onboard, and amount of fuel onboard the aircraft.

11. The method of claim 8, further comprising measuring the current landing data using one or more sensors configured to detect fluids or ice on the runway or detect contaminants on the runway; and wherein the current landing data includes data characterizing a presence of fluids or ice on the runway or the contaminants on the runway.

12. The method of claim 8, wherein the expected brake action and the predicted current brake action further include data characterizing: a deceleration rate of the aircraft, reverse thrust applied on the aircraft, wind effects on the aircraft during landing, and a time required, from touchdown, for the aircraft to reach taxi speed or landing roll.

13. The method of claim 8, wherein the predicted current runway condition output to the air traffic controller and the expected runway condition received from the air traffic controller are characterized using a runway condition description selected from the group consisting of: "dry", "wet", "slippery wet", and "contaminated", and wherein the method further comprises:

storing the predicted current runway condition and the predicted current brake action in a cloud storage device, using Internet of Things (IoT) protocols, for analysis and made available to a next landing aircraft at the runway, flight dispatchers, or air traffic controller.

14. The method of claim 8, wherein data indicating the runway used for data indicating the location at which the aircraft exits the runway during landing, includes at least one of a length or width of the runway.

15. A non-transitory computer readable storage medium having executable instructions stored thereon for controlling brake action of an aircraft based on a current runway condition of a runway on which the aircraft is landing, the aircraft comprising a brake system including brakes configured to slow the aircraft during landing, the executable instructions being executable by one or more processors of a controller device in communication with the brakes, wherein upon execution of the executable instructions the one or more processors are configured to:

receive data from an air traffic controller characterizing an expected runway condition of the runway and an expected brake action for the aircraft, the expected brake action defining at least an expected brake pressure to be applied by the brakes for slowing the aircraft based on the expected runway condition of the runway;

measure, via a landing data measurement and transmission component of the controller device, current landing data of the aircraft including at least a current brake action during landing and data indicating a location at which the aircraft exits the runway during landing, wherein the data indicating the location at which the aircraft exits the runway during landing is determined via a navigation system, wherein the current brake action includes information associated with pressure applied to the brakes measured by a pressure sensor, and wherein the controller device is in communication with a plurality of sensors of the aircraft, including at least the pressure sensor;

transmit, by the landing data measurement and transmission component, the current landing data to a machine learning model configured to predict the current runway condition and the current brake action, the machine learning model built using a machine learning algorithm trained using historical runway condition data and historical landing data, including historical brake action data, of other aircraft landing at the runway;

compare the predicted current runway condition of the runway and the predicted current brake action of the aircraft to the data characterizing the expected runway condition of the runway and the expected brake action of the aircraft;

output at least one of the predicted current runway condition and the predicted current brake action to the air traffic controller for updating at least one of the expected runway condition and the expected brake action if the data characterizing the expected runway condition or the expected brake action does not correspond to the predicted current runway condition or the predicted current brake action; and cause, based on the output, at least one of the aircraft or another aircraft to adjust their brake pressure to accommodate for runway conditions.

16. The non-transitory computer readable storage medium of claim 15, wherein the current landing data further includes a deceleration rate of the aircraft, weather data, data indicating a runway used by the aircraft, wherein the one or more processors are further configured to:

receive data indicating the deceleration rate of the aircraft during landing from a speedometer or accelerometer of the aircraft;

receive the data indicating the location at which the aircraft exits the runway during landing from the navigation system;

receive data indicating current brake pressure applied by the brakes during landing from a pressure sensor configured to measure the current brake pressure applied by the brakes during landing;

receive the weather data from a weather service provider, weather radar device, or from air traffic control; and receive data indicating the runway used by the aircraft, including a length and width of the runway, from an on-board navigation database of the aircraft.

17. The non-transitory computer readable storage medium of claim 15, wherein the current landing data further includes aircraft configuration parameters selected from the group consisting of: aircraft model, weight, seat configuration, number of passengers onboard, and amount of fuel onboard the aircraft.

18. The non-transitory computer readable storage medium of claim 15, wherein the one or more processors are further configured to measure the current landing data using one or more sensors configured to detect fluids or ice on the runway or detect contaminants on the runway; and wherein the current landing data includes data characterizing a presence of fluids or ice on the runway or the contaminants on the runway.

19. The non-transitory computer readable storage medium of claim 15, wherein the expected brake action and the predicted current brake action further include data characterizing: a deceleration rate of the aircraft, reverse thrust applied on the aircraft, wind effects on the aircraft during landing, and a time it takes, from touchdown, for the aircraft to reach taxi speed or landing roll.

20. The non-transitory computer readable storage medium of claim 15, wherein the predicted current runway condition output to the air traffic controller and the expected runway condition received from the air traffic controller are characterized using a runway condition description selected from the group consisting of: "dry", "wet", "slippery wet", and "contaminated", and wherein the one or more processors are further configured to:

store the predicted current runway condition and the predicted current brake action in a cloud storage device, using Internet of Things (IoT) protocols, for further analysis and made available to a next landing aircraft at the runway, flight dispatchers, or air traffic controller.

\* \* \* \* \*